(12) United States Patent
Wiser

(10) Patent No.: US 8,252,097 B2
(45) Date of Patent: Aug. 28, 2012

(54) DISTRIBUTED AIR CLEANER SYSTEM FOR ENCLOSED ELECTRONIC DEVICES

(75) Inventor: Forwood C Wiser, Kingston, NJ (US)

(73) Assignee: Environmental Management Confederation, Inc., Princeton, NJ (US)

( * ) Notice: Subject to any disclaimer, the term of this patent is extended or adjusted under 35 U.S.C. 154(b) by 0 days.

(21) Appl. No.: 11/618,555

(22) Filed: Dec. 29, 2006

(65) Prior Publication Data
US 2007/0199287 A1   Aug. 30, 2007

(51) Int. Cl.
*B01D 46/00* (2006.01)
(52) U.S. Cl. ......... 96/59; 55/385.1; 55/385.2; 55/385.6; 96/66; 96/70; 454/184; 194/350
(58) Field of Classification Search ............... 55/385.1, 55/385.2, 385.6, 473, 356, DIG. 18, DIG. 39; 273/287, 309; 454/230, 306, 338; 95/57, 95/63, 70, 79; 96/58, 59, 70, 66, 68, 15, 96/72, 79, 95, 98
See application file for complete search history.

(56) References Cited

U.S. PATENT DOCUMENTS

| | | | |
|---|---|---|---|
| 2,571,079 A | 12/1948 | Warburton | |
| 2,908,348 A | 11/1957 | Rivers et al. | |
| 3,073,094 A | 1/1963 | Landgraf et al. | |
| 3,471,695 A | 10/1969 | Hudson et al. | |
| 3,509,696 A | 5/1970 | Thompson | |
| 4,248,162 A * | 2/1981 | Skeist | 108/50.13 |
| 4,322,232 A | 3/1982 | Beane | |
| 4,549,887 A | 10/1985 | Joannou | |
| 4,555,252 A | 11/1985 | Eckstein | |
| 4,715,870 A | 12/1987 | Masuda et al. | |
| 4,750,921 A | 6/1988 | Sugita et al. | |
| 4,828,586 A | 5/1989 | Joannou | |
| 4,853,005 A | 8/1989 | Jaisinghani et al. | |
| 4,886,526 A | 12/1989 | Joannou | |
| 4,886,527 A | 12/1989 | Fottinger et al. | |
| 4,889,542 A | 12/1989 | Hayes | |
| 4,902,306 A | 2/1990 | Burnett et al. | |
| 4,978,372 A | 12/1990 | Pick | |
| 5,108,470 A | 4/1992 | Pick | |
| 5,160,517 A * | 11/1992 | Hicks et al. | 55/385.1 |
| 5,192,342 A * | 3/1993 | Baron et al. | 95/90 |
| 5,240,478 A * | 8/1993 | Messina | 95/273 |
| 5,322,473 A * | 6/1994 | Hofstra et al. | 454/186 |
| 5,330,559 A | 7/1994 | Cheney et al. | |
| 5,330,722 A | 7/1994 | Pick et al. | |
| 5,336,299 A | 8/1994 | Savell | |
| 5,360,469 A * | 11/1994 | Baron et al. | 95/273 |

(Continued)

FOREIGN PATENT DOCUMENTS

CA   1272453   8/1990

(Continued)

*Primary Examiner* — Duane Smith
*Assistant Examiner* — Minh-Chau Pham
(74) *Attorney, Agent, or Firm* — Volpe and Koenig, P.C.

(57) ABSTRACT

An air cleaner for an enclosed electronic device such as an electronic slot machine, for use in areas that have a high level of air contamination from cigarette smoking such as casinos, includes an active field polarized media air cleaner or other filters for removing sub-micron particles, tars and/or volatile organic compounds (VOC's). In addition, a shared air cleaner for removing sub-micron particles, tars and/or VOCs is coupled to a plurality of enclosed electronic devices, such as a cluster of electronic slot machines.

10 Claims, 2 Drawing Sheets

U.S. PATENT DOCUMENTS

| | | | |
|---|---|---|---|
| 5,380,503 A * | 1/1995 | Fujii et al. .................... 422/243 |
| 5,417,433 A * | 5/1995 | Phillips ......................... 273/309 |
| 5,441,279 A * | 8/1995 | Messina ........................ 273/309 |
| 5,474,599 A | 12/1995 | Cheney et al. |
| 5,562,286 A * | 10/1996 | Brinket .......................... 273/309 |
| 5,573,577 A | 11/1996 | Joannou |
| 5,593,476 A | 1/1997 | Coppom |
| 5,616,172 A * | 4/1997 | Tuckerman et al. .............. 96/16 |
| 5,627,376 A | 5/1997 | Jaisinghani et al. |
| 5,730,770 A | 3/1998 | Greisz |
| 5,807,425 A | 9/1998 | Gibbs |
| 5,846,302 A | 12/1998 | Putro |
| 5,888,274 A | 3/1999 | Frederick |
| 5,997,619 A * | 12/1999 | Knuth et al. ................... 96/224 |
| 6,063,167 A | 5/2000 | Rutkowski |
| 6,077,334 A | 6/2000 | Joannou |
| 6,099,607 A * | 8/2000 | Haslebacher ................... 55/356 |
| 6,294,004 B1 | 9/2001 | Summers et al. |
| 6,428,610 B1 | 8/2002 | Tsai et al. |
| 6,464,760 B1 * | 10/2002 | Sham et al. .................. 96/117.5 |
| 6,491,743 B1 | 12/2002 | Joannou et al. |
| 6,497,754 B2 | 12/2002 | Joannou |
| 6,514,324 B1 | 2/2003 | Chapman |
| 6,544,309 B1 * | 4/2003 | Hoefer et al. ................... 55/283 |
| 6,547,860 B2 | 4/2003 | Buchwald et al. |
| 6,572,685 B2 | 6/2003 | Dunshee |
| 6,723,150 B2 | 4/2004 | Parker |
| 6,764,533 B2 | 7/2004 | Lobiondo, Jr. |
| 6,955,708 B1 | 10/2005 | Julos et al. |
| 6,984,259 B2 * | 1/2006 | Hurst ............................... 95/273 |
| 7,014,688 B2 * | 3/2006 | Griffiths et al. ................... 96/67 |
| 7,025,806 B2 | 4/2006 | Coppom et al. |
| 7,112,232 B2 * | 9/2006 | Chang et al. .................... 55/481 |
| 7,150,780 B2 * | 12/2006 | Krichtafovitch et al. ......... 96/72 |
| 7,323,146 B2 | 1/2008 | Kim et al. |
| 7,364,607 B2 | 4/2008 | Ueda et al. |
| 7,367,997 B1 | 5/2008 | Isogawa |
| 7,445,654 B2 * | 11/2008 | Wong ........................... 55/385.6 |
| 7,455,706 B2 * | 11/2008 | Latham et al. ................ 55/385.1 |
| 7,459,002 B2 * | 12/2008 | Kalous et al. ................ 55/385.1 |
| 7,686,869 B2 | 3/2010 | Wiser et al. |
| 7,708,813 B2 | 5/2010 | Wiser et al. |
| 2002/0021194 A1 | 2/2002 | Machara et al. |
| 2004/0144254 A1 | 7/2004 | Wiser, III et al. |
| 2005/0045036 A1 | 3/2005 | Vetter et al. |
| 2005/0108996 A1 | 5/2005 | Latham et al. |
| 2005/0150384 A1 | 7/2005 | Krichtafovitch et al. |
| 2005/0172812 A1 | 8/2005 | Ueda et al. |
| 2006/0042205 A1 | 3/2006 | Kalous et al. |
| 2006/0064953 A1 | 3/2006 | Wong |
| 2006/0137527 A1 | 6/2006 | Joannou |
| 2006/0180023 A1 | 8/2006 | Coppom et al. |

FOREIGN PATENT DOCUMENTS

| | | |
|---|---|---|
| DE | 3339828 | 5/1985 |
| EP | 0229857 A1 | 7/1987 |
| JP | 355024561 A | 2/1980 |
| JP | 61008149 | 1/1986 |
| JP | 01307463 | 12/1989 |
| JP | 05093524 | 4/1993 |
| JP | 06007621 | 1/1994 |
| JP | 09010628 | 1/1997 |
| JP | 2001518378 | 10/2001 |
| JP | 2003275526 | 9/2003 |
| JP | 05320926 | 11/2005 |
| RU | 2240856 | 12/1990 |
| RU | 2026751 | 1/1995 |
| WO | 0074818 A1 | 12/2000 |

\* cited by examiner

DISTRIBUTED AIR CLEANER SYSTEM FOR ENCLOSED ELECTRONIC DEVICES

FIELD OF THE INVENTION

The present invention relates generally to electrostatic air cleaning equipment and is particularly directed to removing gas and particles from contaminating the components inside an enclosed electronic device, such a gaming device as for example an electronic slot machine.

BACKGROUND OF THE INVENTION

Certain environments present special problems in air cleaning and filtration. In particular, casinos contain large enclosed areas and typically do not have windows for exchanging stale air for fresh air. Furthermore, casino environments suffer from a high level of air contamination, namely sub-micron particles, tars and volatile organic compounds (VOCs) largely from cigarette smoke. As a result, casinos often have extensive heating, ventilation and air conditioning (HVAC) filtration systems with high-efficiency filters especially designed to remove such contaminants from casino air. Such filter systems often include large banks of active field polarized media air cleaners to remove sub-micron contaminants from the casino environment.

As a separate requirement, casino electronic gaming devices such as electronic slot machines require that air be circulated over the internal components primarily to dissipate heat and keep operational temperatures in acceptable ranges. Typically, electronic equipment cooling fans include an integrated filter. Existing filter/fan combinations for electronic gaming machines use fairly coarse filtration to capture only larger visible dust particles.

SUMMARY OF THE INVENTION

A growing body of evidence suggests that very small, sub-micron particles, tars and VOCs are responsible for premature failure of electronics. In casino environments, airborne sub-micron particles, tars and VOCs can build up inside the electronic enclosure and lead to failure of the internal components, namely microprocessors, memories and passive components. The problem is especially acute in environments with high levels of ambient contaminants such as exist in casinos. Electronic devices and equipment such as slot machines are therefore prone to breakdown due to the fouling of internal components with the sub-micron particles, tars, and VOCs largely from cigarette smoke.

Although the casino's HVAC system attempts to filter out cigarette smoke contaminants from the air, the players generate the cigarette smoke adjacent to the slot machines. As a result, these contaminants, which are generated in the vicinity of the slot machine, are swept into the slot machine before the casino's HVAC system has an opportunity to remove them from the air.

The present invention is embodied in a distributed active field polarized media air cleaner system for electronic enclosures such as gaming machines in which a dedicated active field polarized media air cleaner is provided for each gaming machine. The present invention is further embodied in a distributed active field polarized media air cleaner system for electronic enclosures, such as a gaming machine, in which an active field polarized media air cleaner is shared by a cluster of gaming machines.

An active field polarized media air cleaner is used because of its ability to remove both particle and gaseous contaminants and its superior loading characteristics. However, other filtration systems, either alone or in combination with the active field polarized media air cleaners, for removal of these particles (sub-micron particles, tars) and gaseous contaminants (VOCs). Examples of such other filters include pre-filters for the polarized media and gas phase media, such as activated carbon. Thus, the present invention is embodied in a distributed filtration system for electronic enclosures such as gaming machines in which a dedicated filter is provided for removing sub-micron particles, tars and/or VOCs from the air and surrounding such electronic enclosure.

The present invention creates a microclimate within each gaming machine to clean and cool the air, keeping the interior free from contaminants. In addition, since the air is cleaned locally, the quality of the air in the proximity of the gaming machine is improved.

Finally, since the contaminants generated by the cigarette-smoking player (sub-micron particles, tars and VOCs) are captured by the filtration system in the gaming machine near their source of origin, such contaminants are not distributed throughout the casino, thereby reducing the burden on the casinos HVAC air filtration system. The result is that the air cleaning system for removing sub-micron particles, tars and/or VOCs from casino air is distributed throughout the casino.

DETAILED DESCRIPTION

An active field polarized media air cleaner uses an electrostatic field created by a voltage differential between two electrodes. A dielectric filter media is placed in the electrostatic field between the two electrodes. The electrostatic field polarizes both the media fibers and the particles that enter, thereby increasing the efficiency of the media and the air cleaner.

A further electrostatic air filter design is disclosed in Canadian Patent No. 1,272,453, in which a disposable rectangular cartridge is connected to a high voltage power supply. The cartridge consists of a conductive inner center screen, which is sandwiched between two layers of a dielectric fibrous material (either plastic or glass). The two dielectric layers are, in turn, further sandwiched between two outer screens of conductive material. The conductive inner center screen is raised to a high voltage, thereby creating an electrostatic field between the inner center screen and the two conductive outer screens that are kept at an opposite or ground potential. The high voltage electrostatic field polarizes the fibers of the two dielectric layers.

Figure 1A:
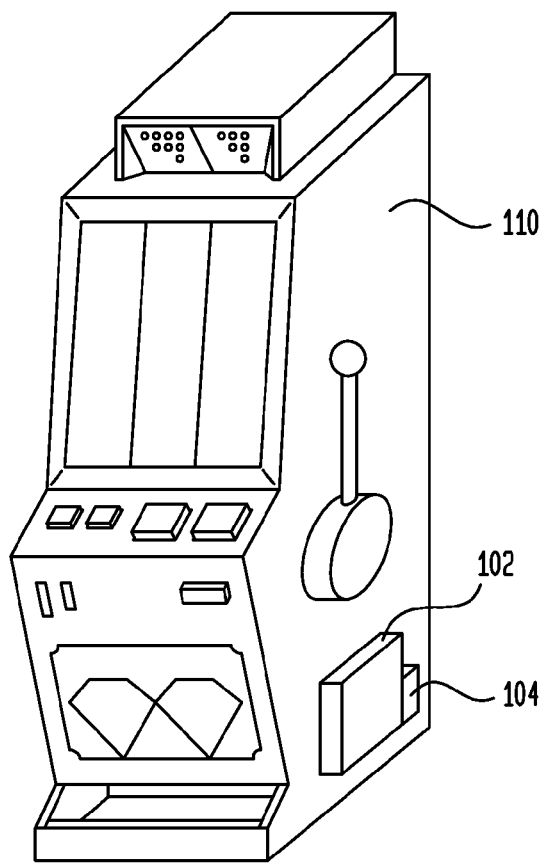
FIG. 1A illustrates an embodiment of the invention in which an air cleaner is mounted on the exterior wall of an electronic gaming machine.
Figure 1B:
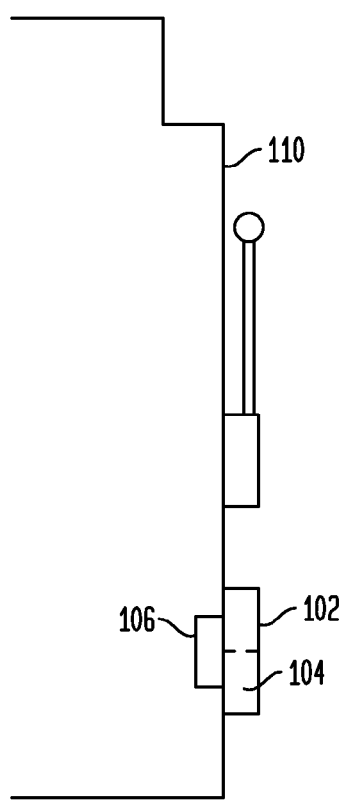
FIG. 1B is a cross-sectional view of the electronic gaming machine of FIG. 1A.

FIG. 1A depicts an embodiment of the invention in which an active field polarized media air cleaner (or other system capable of removing both particles and gaseous contaminants) is integrated into an air cleaner housing 102 mounted on the exterior wall of an electronic gaming machine 110. A combination fan control unit/high voltage power supply 104 is attached to the air cleaner housing 102. In the cross-sectional view of FIG. 1B, the air cleaner housing 102 is shown connected to an internal fan 106. Alternatively, the fan 106 could be mounted on the exterior of the air cleaner housing 102.

Figure 2:
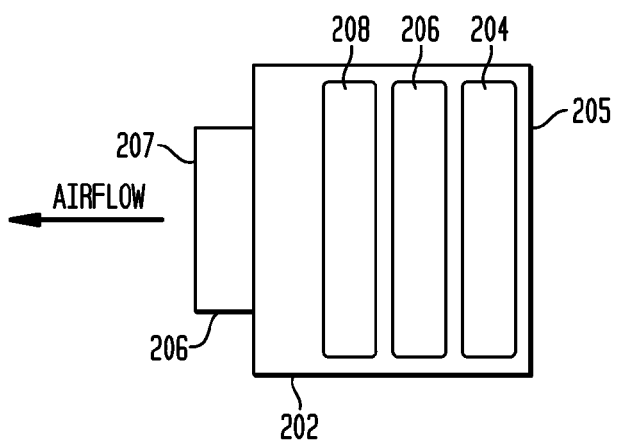
FIG. 2 illustrates an embodiment of the invention in which various media are used in a modular air cleaning housing.

FIG. 2 depicts an embodiment of the invention, which comprises a modular air cleaning housing to accommodate various media 204, 206 and 208 in combination, to perform specific air filtration tasks. In operation, air entering the inlet port 205 of the housing 202 first passes through a rough filter 204. The air then successively passes through a gaseous contaminant media 206 and a fine particle filter 208 before being discharged through the outlet port 207 by a fan 206. Air entering the enclosure of the electronic gaming machine 110 in FIG. 1 is thus cleaned. The electronic gaming machine 110 further includes vents (not shown) for allowing air to exit the electronic enclosure. The inlet airflow cools the interior components of the electronic gaming machine 110. At the same time, the clean air is returned to the casino environment upon exiting the electronic gaming machine 101.

Each electronic gaming machine may have its own separate air cleaner/cooling unit (102, 104, 106). However when there is a grouping of electronic enclosures in a cluster, it may be more cost-effective to provide a centralized air cleaning system.

Figure 3:
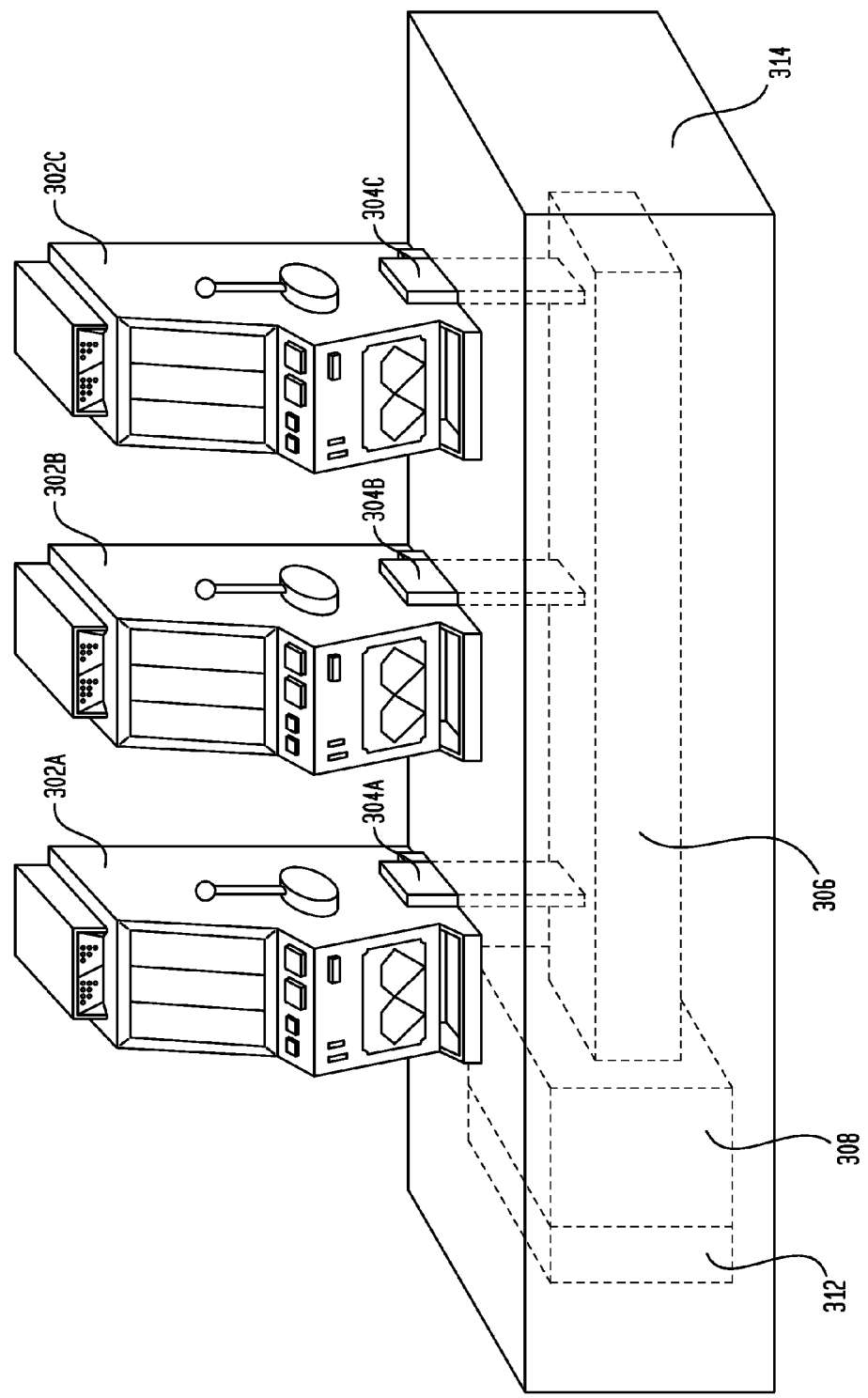
FIG. 3 illustrates a distributed air cleaning system for sharing and air cleaning system among a cluster of electronic gaming machines.

FIG. 3 illustrates an embodiment of the invention in which a single air cleaning/cooling unit 308 is shared among a plurality of electronic gaming machines 302A, 302B and 302C. A shared fan 312 drives air through a shared air cleaning/cooling unit 308 that contains filters for removing sub-micron particles, tars and VOCs from the air. Clean air exiting the shared cleaning/cooling unit 308 is distributed via ductwork 306, 304A, 304B, and 304C to the individual electronic gaming machines 302A, 302B and 302C. In particular, a first portion of the cleaned cooling air is provided to the enclosure of first electronic gaming machine 302A via duct 304A. Another portion of the cleaned cooling air is provided to the enclosure of second electronic gaming machine 302B via duct 304B. The remaining portion of the cleaned cooling air is provided to the enclosure of third electronic gaming machine 302C via duct 304C.

Although the shared air cleaning/cooling unit 308A is shown positioned to the left of the individual electronic gaming machine 302A, it may be desirable to centrally locate the shared air cleaning/cooling unit 308A closer to the center the cluster of the electronic gaming machines 302A, 302B and 302C. Preferably, the shared air cleaning/cooling unit 308A would be located directly below the middle electronic gaming machine 302B. In such manner, contaminants generated by cigarette smoking in the vicinity of electronic gaming machines 302A and 302C would be in close proximity to the shared air cleaning/cooling unit 308A.

What is claimed is:

1. A casino gaming device comprising:
   an enclosure comprising vents open to air outside the enclosure;
   a polarized active media air cleaner comprising an inlet port, an outlet port, and at least one filter;
   casino gaming electronic components located within the enclosure;
   wherein outside air flows through the inlet port, through the at least one filter, and through the outlet port to create filtered air;
   wherein the filtered air cools the electronic components and then exits the enclosure through the vents;
   wherein the polarized active media air cleaner comprises two dielectric layers between two outer layers of conductive material and at least two electrodes with a voltage differential therebetween and the at least one filter is located in an electrostatic field created by the at least two electrodes;
   wherein the polarized active media air cleaner filters sub-micron particles, tars, and VOCs.

2. The casino gaming device of claim 1, wherein the at least one filter is an active field polarized media air cleaner filter that removes one of sub-micron particles, tars or VOCs from the air flowing through the at least one filter.

3. The casino gaming device of claim 1, wherein the air flow is driven by a fan.

4. The casino gaming device of claim 1, wherein the polarized active media air cleaner is located outside the enclosure.

5. The casino gaming device of claim 1, wherein the polarized active media air cleaner is located inside the enclosure.

6. The casino gaming device of claim 1, wherein the at least one filter comprises a rough filter.

7. The casino gaming device of claim 6, wherein the at least one filter comprises a gaseous contaminant filter.

8. The casino gaming device of claim 7, wherein the at least one filter comprises a fine particle filter.

9. A casino gaming device for providing cooled air to a plurality of electronic components comprising:
   a plurality of enclosures comprising vents open to air outside the enclosures and an inlet;
   a polarized active media air cleaner comprising an inlet port, an outlet port, and at least one filter;
   casino gaming electronic components located within each of the plurality of enclosures;
   ductwork that connects the polarized active air media cleaner outlet to each of the plurality of enclosures' inlets;
   wherein air flows through the polarized active media air cleaner inlet port, through the at least one filter, and through the outlet port to create filtered air;
   wherein the filtered air passes through the ductwork through the enclosures' inlets where the filtered air cools the electronic components and then exits the enclosures through the vents;
   wherein the polarized active media air cleaner comprises two dielectric layers between two outer layers of conductive material and at least two electrodes with a voltage differential therebetween and the at least one filter is located in an electrostatic field created by the at least two electrodes;
   wherein the polarized active media air cleaner filters sub-micron particles, tars, and VOCs.

10. A casino gaming device for providing cooled air to a plurality of electronic components comprising:
   a plurality of enclosures comprising vents open to air outside the enclosures;
   at least one polarized active media air cleaner comprising an inlet port, an outlet port, and at least one filter;
   casino gaming electronic components located within each of the plurality of enclosures;
   ductwork that connects a forced air source to each of the plurality of enclosures;
   wherein air flows through the ductwork through the at least one polarized media air cleaner inlet port, through the at least one filter, and through the at least one polarized active media air cleaner outlet port to create filtered air;
   wherein the filtered air passes into the plurality of enclosures to cool the electronic components and then exits the enclosures through the vents;

wherein the polarized active media air cleaner comprises two dielectric layers between two outer layers of conductive material and at least two electrodes with a voltage differential therebetween and the at least one filter is located in an electrostatic field created by the at least two electrodes;

wherein the polarized active media air cleaner filters sub-micron particles, tars, and VOCs.

* * * * *